United States Patent [19]

Larson et al.

[11] Patent Number: 4,709,663
[45] Date of Patent: Dec. 1, 1987

[54] FLOW CONTROL DEVICE FOR SOLID PARTICULATE MATERIAL

[75] Inventors: John W. Larson, Sturbridge; Ronald W. Breault, Paxton, both of Mass.

[73] Assignee: Riley Stoker Corporation, Worcester, Mass.

[21] Appl. No.: 939,819

[22] Filed: Dec. 9, 1986

[51] Int. Cl.[4] ............................................. F22B 1/00
[52] U.S. Cl. .................................. 122/4 D; 110/245; 165/104.16
[58] Field of Search ............... 122/4 D; 110/245, 347; 431/7, 170; 406/138, 146; 165/104.16

[56] References Cited

U.S. PATENT DOCUMENTS

| | | | |
|---|---|---|---|
| 4,085,707 | 4/1978 | Moss | 122/4 D |
| 4,457,289 | 7/1984 | Korenberg | 110/245 X |
| 4,473,032 | 9/1984 | Maintok | 122/4 D |
| 4,538,549 | 9/1985 | Stromberg | 110/245 X |
| 4,584,949 | 4/1986 | Brannstrom | 122/4 D |

Primary Examiner—Edward G. Favors
Attorney, Agent, or Firm—Mason, Kolehmainen, Rathburn & Wyss

[57] ABSTRACT

A flow control device for solid particulate material such as recycled granular solids utilized in a fluidized bed combustion vessel includes a generally horizontal material feeder conduit having an outlet end in communication with the fluidized bed of the combustion vessel and a receiving end remote therefrom. An upstanding material collector conduit having a lower end in communication with a receiving end of the feeder conduit is provided and an upper end of the collector conduit is adapted to receive a flow of particulate solid material to be fed at a controlled flow rate into the combustion vessel. The upstanding collector conduit forms a standpipe for retaining a quantity of material to establish a pressure sealing head or column of material extending upwardly of the receiving end of the feeder conduit. A gas assisted flow initiator and controller extends into the feeder conduit for directing a flow of pressurized gas into the solid particulate material to fluidize the same for travel into the combustion vessel at a selected flow rate.

28 Claims, 8 Drawing Figures

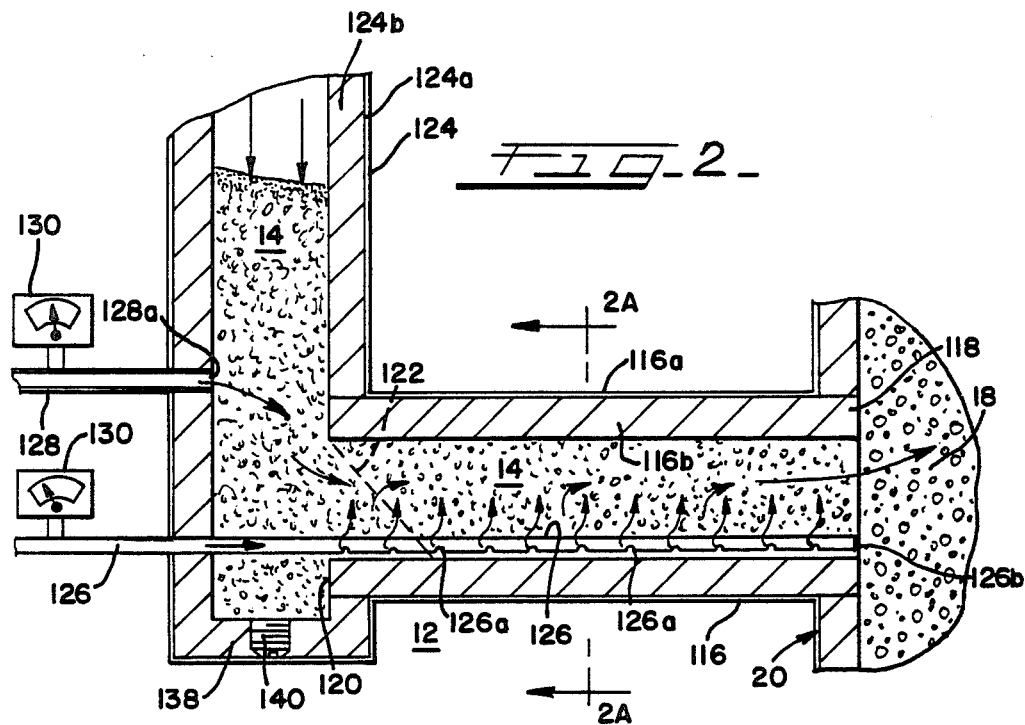
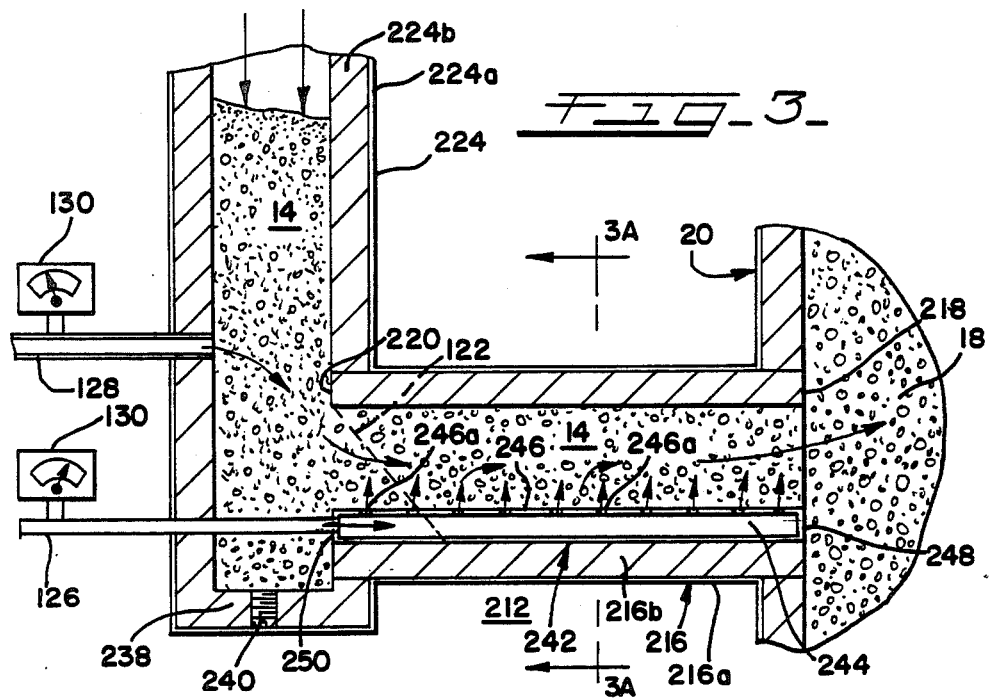

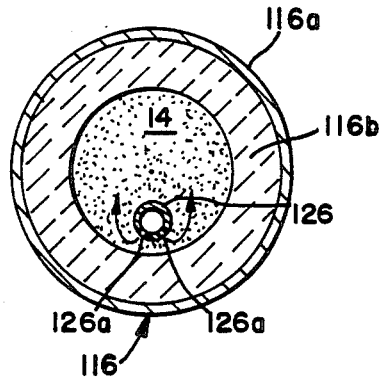
FIG-2A-
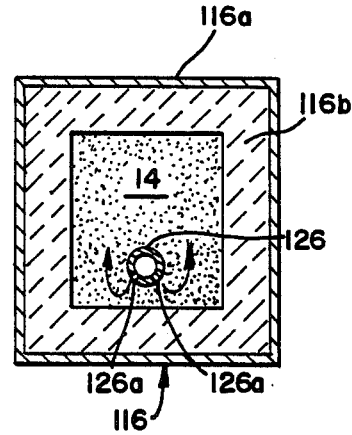
FIG-2B-
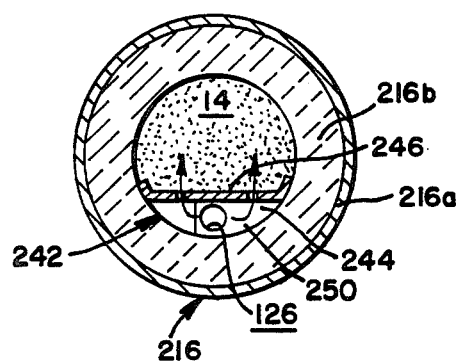
FIG-3A-
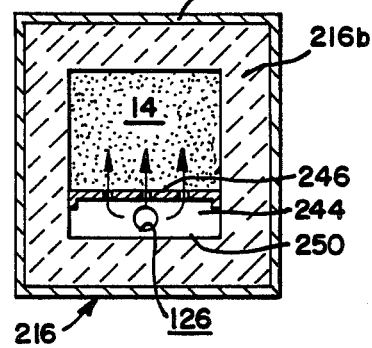
FIG-3B-
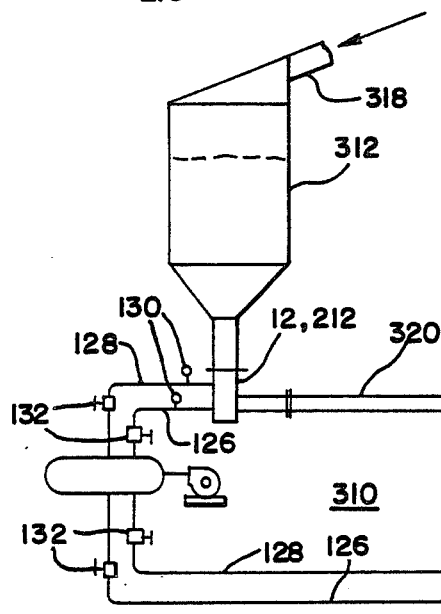
FIG-4-

FLOW CONTROL DEVICE FOR SOLID PARTICULATE MATERIAL

BACKGROUND OF THE INVENTION

1. Field of the Invention

The present invention relates to flow control devices for solid particulate materials and more specifically to a flow control apparatus for feeding recycled particulate solid material at a controlled flow rate into a fluidized bed combustion vessel from an external heat exchanger. In general, the invention is concerned with a flow control apparatus for use in feeding solid particulate material at selected flow rates over substantial distances from a supply point to an injection point wherein the material is delivered into a vessel for further treatment and handling.

One novel aspect of the invention resides in the formation of a column or head of the material in a standpipe or similar chamber to provide a continuously present seal of material between a supply or source vessel and a receiving or output vessel so that the respective vessels may be maintained at operating pressures independent of one another. The flow rate of material can also be maintained at a selected rate independent of the operating pressure of the vessels involved. Moreover, a flow control device in accordance with the present invention eliminates the need for mechanical valve elements and requires no moving parts to provide the valving flow control action. The flow control device of the present invention is especially well adapted and designed for controlled feeding of recycled particulate solid materials into a fluidized bed combustion vessel from an external heat exchanger. The flow control device is also useful for a wide variety of other applications wherein solid particulate material is involved.

2. Description of the Prior Art

In multi-solid fluidized bed steam generating systems such as disclosed in U.S. Pat. Nos. 4,084,545 and 4,154,581 heating devices known as "L-valves" have been provided for recycling solid particulate material back into a dense fluidized bed in a combustion vessel from a supply source such as a cyclone type separator. A problem associated with such L-valves often occurs when the length of a horizontal feeder conduit or horizontal leg of an L-valve is too great so that the material tends to stagnate or plug up and block off flow through the horizontal leg of the L-valve. Moreover, some types of materials are extremely difficult to move through a lengthy horizontal flow conduit into a remote vessel. Because of these problems, the spacing or distance between the source of recycled fines and the combustion vessel has been limited or in the alternative, mechanical feeders having moving parts and high energy requirements were necessitated. Another problem associated with conventional L-valves is the requirement for a sloping feed conduit rather than a horizontal leg when the distance between the supply of recycled solid material and the combustion vessel become too great to be accommodated with a horizontally extended feeder conduit. In any case, the lack of a suitable flow controllable, feeding device for solid particulate material results in design constraints on the positioning and placement of components in a steam generating system which are undesirable.

OBJECTS OF THE PRESENT INVENTION

Accordingly, it is an object of the present invention to provide a new and improved flow control device for solid particulate material and more specifically a flow control device of the character described which provides reliable operation at a wide variety of selected flow rates, even with a horizontal feeder conduit of relatively great length without fear of plugging or stagnation of material in the feeder conduit.

Another object of the invention is to provide a new and improved flow control device of the character described which requires no moving parts and which establishes a continuous material seal between a source vessel and a receiving vessel so that the vessels can be operated at pressures independent of each other.

Another object of the present invention is to provide a new and improved flow control device of the character described which is particularly well suited for feeding solid particulate materials from one vessel to another in which the flow can be started and stopped at will with little fear of plugging up.

BRIEF DESCRIPTION OF THE INVENTION

The foregoing and other objects and advantages of the present invention are accomplished in an illustrated embodiment herein which comprises and new and improved flow control device for solid particulate material especially adapted for feeding the material from a source vessel to a receiving vessel at selectively controllable flow rates. The flow control device includes an elongated generally horizontal material feeder conduit or leg having an outlet end in communication with the receiving vessel and a receiving end remote therefrom. An upstanding material collector conduit or leg is provided having a lower end in communication with the receiving end of the feeder leg and an upper end of the material collector leg is adapted to receive a flow of solid particulate material from a source vessel such an external heat exchanger or cyclone type solids separator.

The upstanding collector conduit is dimensioned to provide a standpipe adapted to retain a quantity of the solid particulate material thereby establishing a pressure sealing head of material to seal between the respective vessels. The vessels may be operated at substantially different operating pressures without adversely affecting the feeding or flow of material from the source vessel to the receiving vessel. A gas assisted flow initiator and controller is extended into the horizontal feeder conduit or leg and directs a controlled flow of pressurized gas into the solid particulate material fluidizing the material and initiating travel along the leg into the receiving vessel such as a fluidized bed of a combustion vessel. The gas which is injected into the solid particulate material may comprise air or gaseous products of combustion and the injected gas may have an injection pressure greater than that obtaining in the feeder conduit or the vessels. The injected gas is effective to fluidize the material in the horizontal feeder leg so that the head of material contained in the upstanding collector leg or standpipe is sufficient to cause the material to flow in a fluidized state into the receiving vessel. When the gas is turned down, the material flow is reduced or stopped altogether and the material itself provides a seal or shut-off valving action between the supply and receiving vessels.

BRIEF DESCRIPTION OF THE DRAWINGS

For a better understanding of the present invention, reference should be had to the following detailed description taken in conjunction with the drawings, in which:

FIG. 2 is an enlarged, fragmentary vertical cross-sectional view of a flow control device for feeding solid particulate material from a supply source to a receiving vessel constructed in accordnce with the features of the present invention;

FIG. 2A is a transverse, vertical cross-sectional view taken through a horizontally extending feeder conduit or leg of the flow control device of FIG. 2 at lines 2A—2A;

FIG. 2B is a transverse cross-sectional view of an alternate embodiment of a feeder conduit taken on a cross-sectional plane similar to that of FIG. 2A;

FIG. 3 is a vertical elevational view of another embodiment of a flow control device constructed in accordance with the features of the present invention;

FIG. 3A is a transverse cross-sectional view taken substantially along lines 3A—3A of FIG. 3;

FIG. 3B is a transverse cross-sectional view of an alternate embodiment of a horizontal feeder conduit or leg taken on a cross-sectional plane similar to that of FIG. 3A; and FIG. 4 is a schematic elevational view of a storage and transport system for feeding solid particulate material from a first vessel to a second vessel employing flow control feeder devices in accordance with the features of the present invention.

DETAILED DESCRIPTION OF THE PREFERRED EMBODIMENTS

Figure 1:
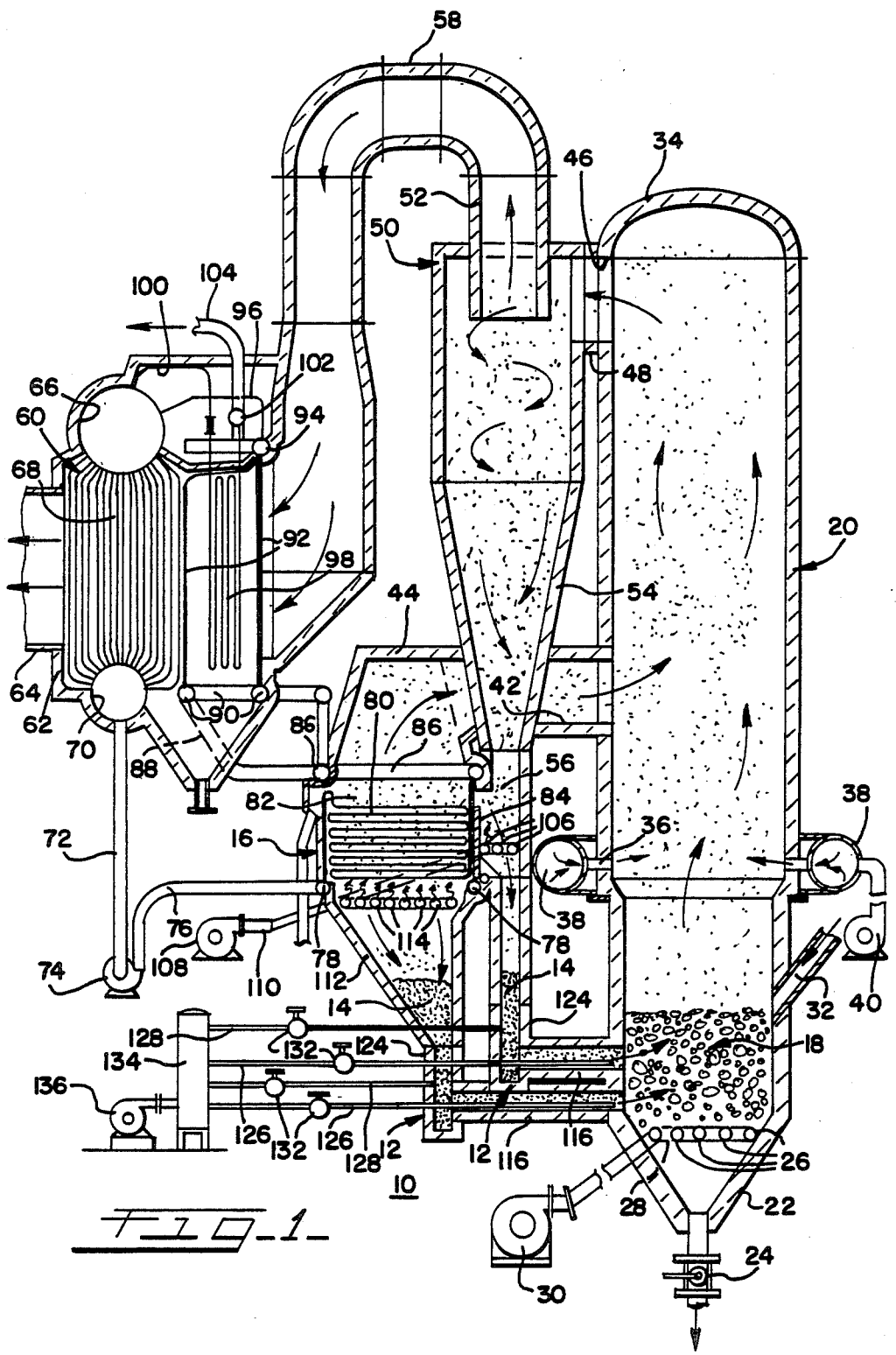
FIG. 1 is an elevational vertical cross-sectional view of a multi-solid fluidized bed steam generating system utilizing flow control devices constructed in accordance with the features of the present invention.

Referring now more particularly to the drawings, in FIG. 1 is illustrated a multi-solid fluidized bed steam generating system 10 utilizing one or more flow control devices 12 for recycling solid particulate material 14 such as hot sand and the like from an external heat exchanger vessel 16 back to a dense bed section 18 of a vertically extending combustion vessel 20. The combustion vessel 20 includes a frusto-conical lower end section 22 with a drain valve 24 at the lower end and a primary source of combustion air is introduced at a level intermediate the frusto-conical section 22 and dense bed section 18 through a plurality of air injector conduits 26 interconnected by one or more supply headers 28 on opposite sides of the combustion vessel and supplied with primary fluidizing combustion air from a suitable source such as a large blower 30 indicated in schematic form in FIG. 1.

Primary air supplied under pressure from the blower 30 moves upwardly through the dense bed section 18 and fluidizes the permanently residing, relatively large size particles of the bed to continuously move around within the bed to effectively transfer heat to the incoming primary combustion air. Fuel for combustion in the form of pulverized coal and/or natural gas along with an additive such as limestone is introduced downwardly adjacent an upper level of the dense bed section 18 via a sloping fuel inlet conduit 32. An intense combustion process takes place in the upper regions and above the dense bed section 18 and the recirculating multi-solid fines 14 absorb the heat of combustion to maintain a controlled maximum temperature as the finer solid material particles move upwardly from the dense bed towards the upper end of the combustion vessel 20.

These recirculating solid particulate material fines may comprise inert refractory material such as sand and include non-burned fuel particles and limestone. The fine solids are mixed with the hot combustion gases and generally flow upwardly from the dense bed region 18 forming a dust space or cloud wherein further combustion and heat absorption by the fines takes place over a substantial height in the combuston vesesl 20 extending from the upper levels of the dense bed to a dome-shaped top 34 at the upper end of the vessel.

Additional secondary combustion air is introduced into the combustion vessel at a level spaced above the fuel conduit 32 through a plurality of radial secondary air injector conduits 36 which are supplied from a ring manifold 38 supplied with secondary air under pressure from a source such as a large blower or fan 40 shown schematically in FIG. 1. Additional heated gas and recycled fine material is supplied to the combustion vessel 20 at a level above the secondary air inlets 36 through an inlet conduit 42 connected to a hood structure 44 above the external heat exchanger 16.

The hot gaseous products of combustion along with solid particulate material including inert fines and unburned or partially burned coal particles and limestone particles pass upwardly to the upper end of the combustion vessel 20 and move radially outwardly through an outlet 46 into a tangentially directed inlet 48 of a cyclone or separator vessel 50 utilizing centrifugal force to separate out the solids from the gaseous products so that the gases flow upwardly through an outlet 52 while the solids fall downwardly into a frusto-conical lower cyclone section 54 having an outlet at the lower end in communication with a hot chamber 56 of the external heat exchanger 16.

The hot gaseous products of combustion leaving the outlet 52 of the cyclone type centrifugal separator 50 flow through a hot gas duct 58 to enter the inlet side of a gas heated convection tube pass 60. The boiler tubes of the convection pass are contained within an insulated housing 62 having an outlet for gas in communication with an exhaust gas duct 64 leading to bag house filters or gas scrubbers before the cleansed gas is finally discharged into the atmosphere.

The convection tube pass housing 62 contains a steam drum 66 at an upper level above the gas outlet 64 and a back of boiler tubes 68 extends downwardly from the steam drum to a mud drum 70 at a level below the gas outlet. Hot water from the mud drum flows down an inlet pipe 72 to a circulating pump 74 and is discharged from the pump through a pressure line 76 connected to a header system 78 of the external heat exchanger 16.

Additional heat is picked up by the hot water as it passes from the header system 78 through a heat exchanger coil 80 provided in a secondary (cooler) chamber 82 of the external heat exchanger 16. The chamber 82 is separated from the hot chamber 56 by a dam 84 and some of the fluidized fines returned to the hot chamber from the outlet 54 of the cyclone 50 flow over the dam into the cooler chamber to give up heat to the water flowing through the coil 80.

After passing through the coil 80, the hot water and steam flows upwardly to a collection header system 86 at an upper level of the external heat exchanger 16, and then flows through a conduit 88 connected to a lower header system 90 at a lower level in the convection pass housing 62. The heated water/steam then flows upwardly through risers 92 to an upper steam header 94 and from the steam header 94 to the steam drum 66 through a steam line 96.

Superheated steam is provided by a superheater tube bank 98 positioned adjacent the hot gas inlet side of the housing 62 and steam is supplied to the superheater coil 98 via a conduit 100 from the steam drum as illustrated. Superheated steam generated in the superheater coil 98 passes upwardly to a collection header 102 and out of the housing for use through a superheated steam output line or conduit 104.

In accordance with the present invention, the hot solid particulate materials separated from the hot gaseous products of combustion in the cyclone centrifugal separator 50 flow downwardly to the hot chamber 56 of the external heat exchanger 16 and in the hot chamber fluidizing air is supplied to fluidize the solids via air inlet headers 106 extending into the lower level of the hot chamber and supplied from a blower 108 through a air duct inlet 110. Some of the heavier particles of material pass directly downwardly from the lower end of the hot chamber 56 into the upper flow control device 12 for recirculation back into the dense bed section 18 of the combustion vessel 20. A portion of the hot solid particulate material reaching the hot chamber 56 however, flows over the dam 84 into the cooler recycle chamber 82 to give up heat to the coil 80. This solid material is colled by giving up heat to the water/steam in the coil 80 and eventually flows downwardly into a discharge hopper 112 below the main body of the external heat exchanger. The hopper 112 has a lower outlet end in communication with the lower flow control device 12 to supply colder solid particulate material thereto for recycling into the dense bed 18 of the combustion level at a low level therein. The hot solid material particulate material reaching the cool chamber 82 around the coil 80 is maintained in a fluidized state by a plurality of air injection headers 114 provided in an array adjacent a bottom level of the chamber and these headers are also supplied with a source of pressurized air from the conduit 110 and blower 108. Some of the fines solid particles are carried upwardly by the fluidizing gas into the hood 44 and are recycled into the combustion vessel 20 through the inlet 42.

Referring now to FIG. 1 and particularly to FIGS. 2 and 2A, each of the new and improved L-valves or flow control devices 12 is adapted to provide an adjustably controllable flow and valve action for recycling solid particulate material 14 that is discharged from the external heat exchanger 16 back into the dense bed section 18 of the combustion vessel 20. The feeder 12 includes an elongated, hollow, tubular, generally horizontally extending conduit or feeder leg 116 provided with a steel outer shell 116a and lined with an inner refractory material 116b. As illustrated in FIG. 2A, the heater conduit 116 has a circular transverse cross-section but if desired, as shown in FIG. 2B, the feeder conduit may also be provided with a square or rectangular transverse cross-section. The conduit includes an outlet end 118 adapted to communicate with the interior of the combustion vessel 20 so that solid particulate material 14 will be injected into the fluidized dense bed material at a level intermediate the upper and lower surface of the dense bed section. The feeder conduit 116 also includes an opposite or receiving end 120 spaced outwardly remote from the outlet or discharge end 118.

In accordance with the invention, the feeder conduit may be horizontal or near horizontal in alignment and can be of an indeterminate length so that close proximity between the combustion vessel 20 and the external heat exchanger 16 is not a limiting requirement. As will be noted in FIG. 2, the solid particulate granular material 14 has an angle of repose indicated by the dotted line 122 and the horizontal length of the feeder leg is substantially in excess of a distance between the inlet end 120 and a point where the lower end of the line 122 representing the angle of repose strikes the lower inside surface of the feeder conduit. Heretofore in L-valves it was difficult to obtain good flow characteristics when the length of the horizontal leg of the L-valve was substantially greater than the distance prescribed by the natural angle of repose striking the lower surface of the horizontal leg.

The feeder or flow control device 12 also includes an upstanding generally vertically extending leg 124 formed with an outer steel jacket 124a and lined with a refractory heat resistant material liner 124b. The upstanding leg 124 includes an upper receiving end in communication with the discharge outlet of the hot recycle chamber 56 of the external heat exchanger 16 or with the outlet at the lower end of the cooler recycle chamber 86 and its discharge hopper 11 as shown in FIG. 1. Material received in the upstanding leg 124 of the flow control devices 12 tends to accumulate in an upwardly extending column to form a standpipe-like head of material which forms a pressure seal between the receiving end of the standpipe leg 124 and the outlet or discharge end of the horizontal feeder leg 116. Accordingly, the operating pressure of the dense bed section 18 in the combustion vessel 20 is not dependent on the operating pressure which obtains in the external heat exchanger 16 so as to adversely effect the operating characteristics of either of the components. The height of material 14 in the vertical or standpipe leg 124 also provides a continuous downward bias or head tending to direct the material dowards toward the receiving end 120 of the horizontal feeder conduit 116 when flow commences.

The material 14 contained in the flow control device 12 is fluidized and flow is initiated and regulated by the injection of pressurized gas such as air introduced from an elongated gas injector conduit 126 having a plurality of longitudinally and radially spaced apart gas injector openings 126a provided on a lower portion thereon as best shown in FIGS. 2A and 2B. The fluidizing air or gas is injected into the feeder conduit 116 under a slight amount of pressure so as to turbulently mix and fluidize the solid particulate material 14 therein ready for movement in horizontal flow toward the discharge end 118 in communication with the dense bed section 18. The air injector conduit 126 is provided with a cap 126b at the outer end adjacent the dense bed section 18 so that the fluidizing gas or air is introduced over substantially the entire length of the conduit 116 to maintain the solid particulate material 14 in a fluidized state.

Pressurized gas or air for initiating and controlling the material flow is also introduced into the upstanding standpipe portion 124 at an elevated level via a conduit 128 having an outlet 128a opening into the interior of the standpipe at a level just above the receiving end 120 of the horizontal leg 116 as illustrated in FIG. 2. The pressurized gas introduced into the flow control device 12 through the upper injector 128 causes the material to move initially after flow has been stopped and thereafter with a controlled flow rate along the horizontal conduit 116. It has been found that a small amount of pressurized gas introduced through the upper injector conduit 128 is highly effective in regulating precisely the volume flow rate of material recycled back into the combustion vessel 20 and in controlling the starting and stoppage of flow as desired. Because the level of the upper air injector conduit 128 is relatively low in relation to the upper level or head of material 14 in the upstanding standpipe leg 124 most of the gas injected flows downwardly into the horizontal feeder leg 116 rather than upwardly from the point of injection through the material seal provided by the column of material. Accordingly, injection of gas or air under pressure from both of the injector conduits 126 and 128 has little effect on the operating air or gas pressure in either the external heating exchanger 16 or the combustion vessel 20.

For precision control and convenience in starting and stopping the flow of material 14 and for regulating the flow rate thereof, the flow of injected gas in the respective air injector conduits 126 and 128 is regulated and meters 130 are provided downstream of flow control valves 132 (FIG. 1) which are operative to control the flow of injected gas into the system or to shut off the flow entirely to the flow control devices 12. Pressurized gas is usually supplied to the injector conduits 126 and 128 from a suitable source such as a compressed air tank 134 or a manifold supplied with compressed gas by a pump or blower 136 as shown in FIG. 1. At the lower end of the vertical leg or standpipe 124 of the flow control devices 12, there is provided an end wall segment 138 with an opening therein and a clean out plug 140 which can be removed as desired for cleaning out material when required.

Referring now to FIGS. 3, 3A and 3B, therein is illustrated a modified form of flow control device referred to generally by the reference numeral 212. Corresponding components of the device 212 which are substantially the same or identical to those in the prior embodiment are provided with an additional prefix reference numeral 2 and will not be described in detail. In accordance with the invention, the flow control device or feeder valve 212 is provided with a modified lower gas injector system referred to generally by the reference numeral 242 and comprising a hollow plenum chamber 244 formed adjacent the bottom of the horizontal feeder leg 216. The plenum chamber 244 is provided with a flat top wall 246 of steel or suitable metal having a plurality of gas injector openings 246a spaced along the length thereof for injecting fluidizing gas under pressure into the material 14. The plenum 244 is provided with an outlet end wall 248 adjacent the outlet end 218 of the horizontal feeder conduit 216 and an inlet end wall 250 is provided adjacent the receiving end 220 of the horizontal feeder leg. The perforations or openings 246a in the upper wall 246 of the plenum chamber 244 provide a fluidizing action on the material 14 over a large area so that the injection of flow initiating and regulating gas from the conduits 126 and 128 is highly effective to move the material along the conduit 216 into the dense bed section 18 of the combustion vessel 20. Precision control of the flow rate of material 14 is achieved by regulating the pressure and flow of the gas injected through the conduits 126 and 128 by means of the meters 130 and control valves 132 provided in the lines.

While the flow control devices 12 and 212 herein described have been utilized in multi-solid fluidized bed steam generation systems as set forth in this disclosure, these devices also have utility in a wide range of applications wherein different types of solid materials in particulate or granular form other than sand or inert materials used in the system 10 are provided. Referring now specifically to FIG. 4, a material transport system 310 is illustrated in somewhat diagrammatic or schematic form to include a plurality of flow control devices 12 or 212 in accordance with the present invention for moving granular or particulate solid material from a first vessel 312 to a second vessel 314 and on to successive vessels or locations by virtue of a discharge conduit 316. Solid material may be delivered by gravity or otherwise through an inlet conduit 318 for storage or containment in the vessel 312. This material flows out of the lower end of the vessel into the receiving end of the standpipe leg of a flow control device 12 or 212 in communication therewith. The material is directed into the second vessel 314 via an outlet conduit 320 in fluidized form and the material may be added to or combined with additional materials supplied to the vessel 314 by an inlet chute 322. The mixed material in a fluidized state then passes downwardly through the outlet end at the lower end of the vessel 314 into a flow control device 12 or 212 and is fed out at a controlled flow rate through the delivery conduit 316 to a remote location. In the system 310 as illustrated in the diagram of FIG. 4, a wide variety of materials may be utilized and exceptionally long distances between the successive vessels 312 and 314 may be tolerated while still providing an accurately controllable flow of material.

Although the present invention has been described in terms of a preferred embodiment, it is intended to include those equivalent structures, some of which may be apparent upon reading this description, and others that may be obvious after study and review.

What is claimed and sought to be secured by Letters Patent of the United States is:

1. Flow control apparatus for feeding recycled particulate solid material into a fluidized bed combustion vessel, said apparatus comprising:

a generally horizontal material feeder conduit having an outlet end in communication with said fluidized bed combustion vessel and a receiving end remote from said vessel;

an upstanding material collector conduit having a lower end in communication with said receiving end of said feeder conduit and an upper end for receiving a flow of said granular solid material to be recycled back into said combustion vessel, said upstanding collector conduit forming a standpipe adapted to retain a quantity of said granular solid material to establish a pressure sealing head of solid material extending in a column upwardly of said receiving end of said feed conduit; and gas assisted flow initiating control means extending into said feeder conduit having a discharge outlet spaced between said outlet end of said feeder conduit and said receiving end thereof that is supplied with solid material from said standpipe for directing of a flow of pressurized gas into said solid material in said feeder conduit to fluidize the solid material for travel into said combustion vessel through said outlet end of said feeder conduit.

2. The flow control apparatus of claim 1, wherein;

said flow initiating control means includes an elongated fluid pipe extending longitudinally of said feeder conduit having an outer end adapted for connection to a source of pressurized gas and having a plurality of gas discharging openings spaced apart along the length of said pipe on an underside thereof positioned within said solid material in said feeder conduit for fluidizing the material to assist in movement of the solid material along said feeder conduit into said combustion vessel.

3. The flow control apparatus of claim 1, wherein;
said flow initiating control means includes a gas plenum chamber mounted into said feeder conduit adjacent a lower wall portion thereof, said plenum changer having an inlet for receiving a supply of pressurized gas and a plurality of gas outlets in a wall of said chamber for discharging a fluidizing flow of pressurized gas into the solid material in said feeder conduit to assist in causing said solid material to flow into said combustion vessel through said outlet end of said feeder conduit.

4. The flow control apparatus of claim 1, wherein;
said flow initiating control means includes a separate inlet for directing pressurized gas into said solid material in said standpipe spaced at a level above said horizontal feeder conduit.

5. The flow control apparatus of claim 4, including;
control valve means for regulating the flow of pressurized gas into said solid material through said flow initiating means to start and stop the flow of solid material in said feeder conduit moving toward said outlet end.

6. The flow control apparatus of claim 1, wherein;
said feeder conduit has a horizontal dimension between said outlet end and said receiving end that is greater than the horizontal distance defined by the angle of repose of said solid material contained in said standpoint extending along a lower surface of said feeder conduit from said receiving end toward said outlet end.

7. The flow control apparatus of claim 5, including;
meter means for use in adjusting the flow of gas through said flow initiating means to control the feed rate of solid material from said feeder conduit into said combustion vessel.

8. The flow control apparatus of claim 7, wherein;
said control valve means includes a control valve for regulating the flow of pressurized gas through said separate inlet of said flow initiating means.

9. The flow control apparatus of claim 7, wherein;
said control valve means includes a control valve for regulating that flow of pressurized gas introduced into said feeder conduit independent of said separate inlet in said standpipe.

10. A system for controlling the flow of particulate solid material from a first vessel to a second vessel, comprising:
a flow control device having a generally horizontal feeder conduit having an outlet end in communication with said second vessel and a receiving end remote from said outlet end;
said device including an upwardly extending standpipe having a lower end in communication with said receiving end of said feeder conduit and adapted to contain a volume of said granular solid material having an upper level spaced above said feeder conduit to provide a sealing head of material between said lower end of said standpipe and an upper end in communication with said first vessel to receive material therefrom; and
gas operated, flow initiating control means for moving said solid material through said device from said first vessel to said second vessel, said flow initiating means including a gas conduit extending into said feeder conduit having outlet means spaced between said outlet end of said feeder conduit and said receiving end thereof that is supplied with solid material from said standpipe, said outlet means including one or more gas outlets in said feeder conduit for directing pressurized gas into said solid material downstream of said standpipe to fluidize said material to flow in said feeder conduit toward said second vessel.

11. The system of claim 10, wherein;
said feeder conduit has a polygonal transverse cross-section with a horizontal bottom wall and a pair of upstanding sidewalls joined thereto; and wherein
said flow initiating control means comprises a gas plenum chamber adjacent said bottom wall and including a perforated upper wall spaced therefrom and joining said sidewalls, the perforations in said upper walls forming said gas outlets for directing pressurized gas from said plenum chamber into said solid material above said upper wall to fluidize the same for movement toward said outlet end of said feeder conduit.

12. The system of claim 10, wherein;
said flow initiating control means comprises an elongated, hollow tubular gas conduit extending from said receiving end of said feeder conduit toward said outlet end, a plurality of said gas outlets spaced longitudinally thereof and formed in lower wall portions of said tubular gas conduit.

13. The system of claim 10, wherein;
said flow initiating control means includes a gas inlet port in a wall portion of said standpipe below said sealing head of material for directing pressurized gas to fluidize the solid granular material in said standpipe to flow into said receiving end of said horizontal feeder conduit.

14. The system of claim 13, wherein;
said flow initiating control means includes a control valve for regulating the flow of pressurized gas introduced through said gas inlet port and a control valve for regulating the flow of pressurized gas introduced through said gas outlets in said gas conduit.

15. The system of claim 14, wherein;
said flow initiating control means includes meter means for indicating the flow of said pressurized gas into said solid granular material.

16. The system of claim 15, wherein;
said meter means includes a meter for indicating the flow of said pressurized gas introduced through said gas inlet port and a meter for indicating the flow of said pressurized gas introduced through said tubular gas conduit.

17. The system of claim 10, wherein;
said second vessel comprises a fluidized bed combustion vessel and said granular solid material comprises heated sand recirculated into said fluidized bed.

18. The system of claim 17, wherein;
said first vessel comprises a heat exchanger externally of said fluidized bed combustion vessel.

19. The flow control apparatus of claim 2, wherein;

said feeder conduit has a polygonal transverse cross-section with a bottom wall and when said gas pipe is positioned adjacent said bottom wall with said gas discharging openings aligned to direct pressurized gas toward said wall.

20. The system of claim 10, wherein;

said feeder conduit has a polygonal transverse cross-section with a bottom wall and a pair of upstanding side walls joined thereto, and wherein;

said flow initiating control means comprises a plenum chamber formed by said bottom wall and sidewalls and a perforated upper wall spaced above said bottom wall, said perforated upper wall including a plurality of gas outlets formed by the perforation spaced longitudinally along said upper wall between said receiving end and said outlet end of said feeder conduit.

21. Flow control apparatus for feeding recycled particulate solid material into a fluidized bed combustion vessel, said apparatus comprising:

a generally horizontal material feeder conduit having an outlet end in communication with said fluidized bed combustion vessel and a receiving end remote from said vessel;

an upstanding material collector conduit having a lower end in communication with said receiving end of said feeder conduit and an upper end for receiving a flow of said granular solid material to be recycled back into said combustion vessel, said upstanding collector conduit forming a standpipe adapted to retain a quantity of said granular solid material to establish a pressure sealing head of solid material extending in a column upwardly of said receiving end of said feed conduit;

gas assisted, flow initiating control means extending into said feeder conduit for directing of a flow of pressurized gas into said solid material to fluidize the solid material for travel into said combustion vessel through said outlet end of said feeder conduit; and wherein said flow initiating control means also includes a separate inlet for directing pressurized gas into said solid material in said standpipe spaced at a level above said horizontal feeder conduit.

22. The flow control apparatus of claim 21, wherein;

said flow initiating control means includes an elongated fluid pipe extending longitudinally of said feeder conduit having an outer end adapted for connection to a source of pressurized gas and having a plurality of gas discharging openings spaced apart along the length of said pipe on an underside thereof positioned within said solid material in said feeder conduit for fluidizing the material to assist in movement of the sold material along said feeder conduit into said combustion vessel.

23. The flow control apparatus of claim 21, wherein;

said flow initiating control means includes a gas plenum chamber mounted into said feeder conduit adjacent a lower wall portion thereof, said plenum changer having an inlet for receiving a supply of pressurized gas and a plurality of gas outlets in a wall of said chamber for discharging a fluidizing flow of pressurized gas into the solid material in said feeder conduit to assist in causing said solid material to flow into said combustion vessel through said outlet end of said feeder conduit.

24. The flow control apparatus of claim 21, including;

control valve means for regulating the flow of pressurized gas into said solid material through said flow initiating means to start and stop the flow of solid material in said feeder conduit moving toward said outlet end.

25. The flow control apparatus of claim 21, wherein;

said feeder conduit has a horizontal dimension between said outlet end and said receiving end that is greater than the horizontal distance defined by the angle of repose of said solid material contained in said standpoint extending along a lower surface of said feeder conduit from said receiving end toward said outlet end.

26. The flow control apparatus of claim 25, including;

meter means for use in adjusting the flow of gas through said flow initiating means to control the feed rate of solid material from said feeder conduit into said combustion vessel.

27. The flow control apparatus of claim 26, wherein;

said control valve means includes a control valve for regulating the flow of pressurized gas through said separate inlet of said flow initiating means.

28. The flow control apparatus of claim 26, wherein;

said control valve means includes a control valve for regulating the flow of pressurized gas introduced into said feeder conduit independent of said separate inlet in said standpipe.

* * * * *